US007284271B2

(12) United States Patent
Lucovsky et al.

(10) Patent No.: US 7,284,271 B2
(45) Date of Patent: Oct. 16, 2007

(54) AUTHORIZING A REQUESTING ENTITY TO OPERATE UPON DATA STRUCTURES

(75) Inventors: Mark Lucovsky, Sammamish, WA (US); Shaun D. Pierce, Sammamish, WA (US); Michael G. Burner, Redmond, WA (US); Richard B. Ward, Seattle, WA (US); Paul J. Leach, Seattle, WA (US); George M. Moore, Issaquah, WA (US); Arthur Zwiegincew, Bothell, WA (US); Robert M. Hyman, Sammamish, WA (US); Jonathan D. Pincus, Bellevue, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 10/003,767

(22) Filed: Oct. 22, 2001

(65) Prior Publication Data

US 2002/0184521 A1 Dec. 5, 2002

Related U.S. Application Data

(60) Provisional application No. 60/275,809, filed on Mar. 14, 2001.

(51) Int. Cl.
*H04L 9/32* (2006.01)
*G06F 12/14* (2006.01)

(52) U.S. Cl. .................. 726/21; 726/8; 726/9; 726/18; 726/19; 726/20; 726/28; 726/29

(58) Field of Classification Search ................ 726/8–9, 726/18–21
See application file for complete search history.

(56) References Cited

U.S. PATENT DOCUMENTS

| 5,544,302 | A |   | 8/1996 | Nguyen ...................... 715/837 |
|-----------|---|---|--------|--------------------------------------|
| 5,634,129 | A |   | 5/1997 | Dickinson ................... 719/315 |
| 5,778,227 | A |   | 7/1998 | Jordan ........................ 395/682 |
| 5,787,427 | A |   | 7/1998 | Benatar et al. ................ 707/9 |
| 5,872,926 | A |   | 2/1999 | Levac et al. ........... 395/200.36 |
| 5,911,143 | A | * | 6/1999 | Deinhart et al. ........ 707/103 R |
| 5,933,820 | A |   | 8/1999 | Beier et al. .................... 707/1 |

(Continued)

OTHER PUBLICATIONS

Chandramouli, Ramaswamy; "Application of XML Tools for Enterprise-Wide RBAC Implementation Tasks"; ACM Press; 2000; pp. 11-18.*

(Continued)

*Primary Examiner*—Gilberto Barrón
*Assistant Examiner*—Jung Kim
(74) *Attorney, Agent, or Firm*—Workman Nydegger

(57) ABSTRACT

Authorizing a requesting entity to have a service perform a particular action in a manner that is at least partially independent of the underlying target data structure. An authorization station maintains a number of role templates that each define basic access permissions with respect to a number of command methods. The authorization station also maintains a number of role definitions that each define access permissions for specific requesting entities by using one or more of the role templates. When the authorization station receives a request from the requesting entity, the authorization station then identifies the appropriate role definition. Using this role definition, the authorization station determines access permissions for the requesting entity with respect to the requested action.

40 Claims, 5 Drawing Sheets

U.S. PATENT DOCUMENTS

| | | | | |
|---|---|---|---|---|
| 5,956,715 | A | 9/1999 | Glasser et al. | 707/9 |
| 5,963,976 | A | 10/1999 | Ogawa et al. | 711/148 |
| 6,023,765 | A * | 2/2000 | Kuhn | 726/4 |
| 6,044,224 | A | 3/2000 | Radia et al. | 395/710 |
| 6,088,675 | A | 7/2000 | MacKenty et al. | 704/270 |
| 6,092,101 | A | 7/2000 | Birrell et al. | 709/206 |
| 6,148,302 | A | 11/2000 | Beylin et al. | 707/102 |
| 6,154,876 | A | 11/2000 | Haley et al. | 717/4 |
| 6,167,402 | A | 12/2000 | Yeager | 707/10 |
| 6,189,032 | B1 | 2/2001 | Susaki et al. | 709/225 |
| 6,192,408 | B1 | 2/2001 | Vahalia et al. | 709/229 |
| 6,195,662 | B1 | 2/2001 | Ellis et al. | 707/103 |
| 6,199,081 | B1 | 3/2001 | Meyerzon et al. | 707/513 |
| 6,202,066 | B1 | 3/2001 | Barkley et al. | 707/9 |
| 6,223,207 | B1 | 4/2001 | Lucovsky | 709/107 |
| 6,282,548 | B1 | 8/2001 | Burner et al. | 707/104 |
| 6,336,118 | B1 | 1/2002 | Hammond | 707/103 |
| 6,336,147 | B1 | 1/2002 | Brownell et al. | 719/310 |
| 6,343,324 | B1 | 1/2002 | Hubis et al. | 709/229 |
| 6,349,302 | B1 | 2/2002 | Aoyama et al. | 707/101 |
| 6,349,307 | B1 | 2/2002 | Chen | 707/103 |
| 6,351,744 | B1 | 2/2002 | Landresse | 707/8 |
| 6,351,843 | B1 | 2/2002 | Berkley et al. | 717/128 |
| 6,356,940 | B1 | 3/2002 | Short | 709/217 |
| 6,370,537 | B1 | 4/2002 | Gilbert et al. | 707/101 |
| 6,377,952 | B1 | 4/2002 | Inohara et al. | 707/101 |
| 6,490,721 | B1 | 12/2002 | Gorshkov et al. | 717/130 |
| 6,519,571 | B1 | 2/2003 | Guheen et al. | 705/14 |
| 6,542,845 | B1 | 4/2003 | Grucci et al. | 702/122 |
| 6,553,427 | B1 | 4/2003 | Chang et al. | 719/314 |
| 6,604,209 | B1 | 8/2003 | Grucci et al. | 714/38 |
| 6,654,747 | B1 | 11/2003 | Van Huben et al. | 707/10 |
| 6,678,682 | B1 | 1/2004 | Jenkins et al. | 707/9 |
| 6,684,204 | B1 | 1/2004 | Lal | 707/3 |
| 6,704,024 | B2 | 3/2004 | Robotham | 345/581 |
| 6,711,612 | B1 | 3/2004 | Blumenau et al. | 709/223 |
| 6,823,458 | B1 | 11/2004 | Lee et al. | 726/16 |
| 6,832,237 | B1 | 12/2004 | Christensen et al. | 709/200 |
| 6,907,457 | B2 | 6/2005 | Merrell et al. | 709/223 |
| 6,917,373 | B2 | 7/2005 | Vong et al. | 715/840 |
| 7,017,016 | B2 | 3/2006 | Chujo | 711/147 |
| 2001/0047385 | A1 | 11/2001 | Tuatini | 370/203 |
| 2002/0029256 | A1 | 3/2002 | Zintel et al. | 709/218 |
| 2002/0035533 | A1 | 3/2002 | Mache et al. | 705/37 |
| 2002/0055951 | A1 | 5/2002 | Shigetomi et al. | 707/501.1 |
| 2002/0133752 | A1 | 9/2002 | Hand | 714/38 |
| 2003/0074423 | A1 | 4/2003 | Mayberry et al. | 709/219 |
| 2004/0139145 | A1 | 7/2004 | Bar-or et al. | 709/201 |

OTHER PUBLICATIONS

Vuong et al.; "Managing Security Policies in a Distributed Environment using XML"; ACM Press; 2001; pp. 405-411.*

Vuong et al. ; "Managing Security Policies in a Distributed Environment Using eXtensible Markup Language (XML)"; Proceedings of the 2001 ACM Symposium on Applied Computing (SAC), Mar. 11-14, 2001, Las Vegas, NV; pp. 405-411.*

Stallings, William; Cryptography and Network Security; 1998; Prentice Hall, Inc.; Chapter 11.*

Caswell, Deborah L., "An Evolution of DCE Authorization Services," *Hewlett-Packard Journal*, vol. 46, No. 6, pp. 49-54, Dec. 1995.

Title: Security requirements for web-services; Author Jerbic, M. ; Report Title: Position papers for World Wide Web consortium (W3C) workshop on web services ; pp. 28-33 Issued by: Hewlett-Packard Lab., Bristol, UK ; Publication Date: 2001 Country of Publication: UK; 50 pp.

Title: A role-based access control model for XML repositories; Author Hao He; Wong, R.K. Conference Title: Proceedings of the First International Conference on Web Information Systems Engineering; Part vol. 1 p. 138-45 vol. 1 Publication Date: 2000; Country of Publication: USA; 2 vol.(xv+498+xvi+219); pp. ISBN: 0 7695 0577 5; Material Identity No. XX-2000-02089 Conference Title: Proceedings of WISE 2000: 1st International Conference on Web Information Systems Engineering; Conference Date: Jun. 19-21, 2000 Conference Location: Hong Kong, China.

Simple Object Access Protocol (SOAP) 1.1 W3C Note May 8, 2000 Don Box, DevelopMentor; David Ehnebuske, IBM; Gopal Kakivaya, Microsoft; Andrew Layman, Microsoft; Noah Mendelsohn, Lotus Development Corp.; Henrik Frystyk Nielsen, Microsoft; Satish Thatte Microsoft; Dave Winer, UserLand Software, Inc.

U.S. Appl. No. 60/275,809, filed Mar. 14, 2001, Lucovsky et al.

Simple Object Access Protocol (SOAP) 1.1 W3C Note May 8, 2000 Don Box, DevelopMentor; David Ehnebuske, IBM; Gopal Kakivaya, Microsoft Anderw Layman, Microsoft; Noah Mendelsohn, Lotus Development Corp,; Henrik Frystyk Nielsen, Microsoft Satish Thatte, Microsoft; Dave Winer, UserLande Software, Inc. pp. 1-35. (Herein after referred to as Article 1.).

Barish, Greg; Untangling the Web; Intelligent Enterprise; Mar. 27, 2001; pp. 38-43. (Herein after referred to as Article 2.).

Dix, Ghris; Working With Soap, The Simple Object Access Protocol; *C/C++ Users Journal*; Jan. 2002; pp. 22-33. (Herein after referred to as Article 3.).

Jepsen, Tom; Soap Cleans up Interoperability Problems on the Web; *IT Pro*; Jan.-Feb. 2001; pp. 52-55. (Herein after referred to as Article 4.).

X Marks the Path; JNJ Online; http://www.dnjonline.com/articles/essentials/iss25_essentials_xpath.asp;Jan. 3, 2002; 6 pgs. (Herein after referred to as Article 5.).

Soap Version 1.2 Part 1: Messaging Framework; http://www.w3.org/TR/2002/WD-soap12-part1-20011002; Nov. 30, 2001; 33 pgs. (Herein after referred to as Article 6.).

Soap Version 1.2 Part 2: Adjuncts; http://www.w3.org/TR/2001/WD-soap12-part2-20011002; Oct. 30, 2001; 43 pgs. (Herein after referred to as Article 7.).

WML Path Language (Xpath) Version 1.0; http://www.w3.org/TR/1999/REC-xpath-19991116;Oct. 30, 2001; 35 pgs. (Herein after referred to as Article 8.).

* cited by examiner

… … …

AUTHORIZING A REQUESTING ENTITY TO OPERATE UPON DATA STRUCTURES

CROSS-REFERENCE TO RELATED APPLICATION

The present application claims priority from co-pending U.S. provisional application Ser. No. 60/275,809, filed Mar. 14, 2001 and entitled "Identity-Based Service Communication Using XML Messaging Interfaces", which provisional application is incorporated herein by reference in its entirety.

BACKGROUND OF THE INVENTION

1. The Field of the Invention

The present invention relates to the field of network security. Specifically, the present invention relates to methods, systems, and computer program products for authorizing a requesting entity to operate upon data structures in a standard manner that is at least partly independent of the type of underlying data structure being operated upon.

2. Background and Related Art

The success of the information age is widely attributed to the ability to efficiently access data. Data comes in a wide, almost unlimited, variety of different data types. For example, there may be data types corresponding to calendar information, task information, in-box information, word processing documents presence information, favorite web site information, or a host of other different types of information. Often, it is desirable to control who has what kind of access to what kind of data. For example, a user or application might have read/write privileges over a small group of files, while having read-only privileges over another group of files.

Conventionally, this was accomplished by using an Access Control List or ACL associated with each file or directory in a hierarchical directory tree structure. Typically, access control rights for a particular directory are inherited by any descendent directories or files unless expressly overwritten by an access control list at the descendent directory or file. When a request comes in to perform an operation on a particular target file or directory, the total access control for that request is defined by any access rights inherited as well as the express enumeration of access rights indicated in the corresponding access control list for the target file or directory. If appropriate for the total access control permissions corresponding to the target file or directory, the request is then processed.

The use of access control lists thus allows for access control at the granularity of a file or directory. However, often certain parts of a file may be more sensitive than others. Regardless, the conventional use of access control lists provides the same level of access to all parts of a file. In other words, conventional access control lists do not provide for granular access control below the file level. Accordingly, what is desired are methods, systems, and computer program products for providing more refined granular access control than the directory or file level.

In addition, conventional access control lists grant the same level of access regardless of the way the user or application was authenticated. However, there are often a wide variety of authorization methods available, each offering a different level of confidence that a user or application requesting operation is indeed who it purports to be. It may not be appropriate to grant the same level of access to a user or application who used a relatively low security authentication method such as the simple assertion method as compared to a user or application that used a relatively high level of authentication. After all, it would be fairly easy for an imposter to simply assert that they were a particular authorized user or application. Accordingly, what is further desired are methods, systems, and computer program products for granting appropriate access privileges based on authentication credentials.

SUMMARY OF THE INVENTION

The present invention extends to methods, systems and computer products for authorizing a requesting entity to have a service perform a particular action in a manner that is at least partially independent of the underlying target data structure that is desired to be accessed. In one operating environment, there are a number of individuals and applications operating through a variety of services on a variety of different types of identity-specific data structures that are organized in accordance with a set or rules. Each service is configured to perform operations on one or more different types of data structures. For example, an identity may have an in-box data structure organized in accordance with an in-box schema and that is managed by an in-box service, a calendar data structure organized in accordance with a calendar schema and that is managed by a calendar service, and so forth.

The principles of the present invention allow for authorization of a requesting entity to occur largely, if not wholly, independent of the type of the underlying data structure that is desired to be operated upon. This allows for a centralized authorization station that performs the entire authorization process for a wide variety of different services. The centralized authorization station may then inform the target service that the requested operation is authorized and provide the service with sufficient information to perform the desired operation on the target data structure. Although only one authorization station is described and illustrated for clarity, there may be more than one (and even numerous) authorization stations that perform the described authorization on behalf of the services.

In one embodiment, the authorization station maintains a number of role templates that each define basic access permissions with respect to a number of command methods. Those role templates may be included within a role map document in which all of the role templates corresponding to a particular service are compiled. The role templates represent coarse-grained access permissions corresponding to permissions that might be of particular use when accessing the particular service. Thus, applications that are not able to implement more fine-grained access control may at least implement these core role templates for coarser-grained control over access permissions. When the authorization station receives a request, it identifies the target service and thereby accesses the appropriate role map that contains the corresponding role templates.

The authorization station also maintains a number of role definitions that each define access permissions for specific requesting entities by using one or more of the role templates. In one embodiment, all of the role definitions that might define access permissions with respect to a particular identity's data are included within a role list document. There may be a role list document corresponding to a particular identity. Each role definition defines access privileges with respect to this identity's data for a requesting entity. The requesting entity is specified by a user identifier, an application-platform combination identifier, and a credential type identifier.

The request specifies the identity whose data is desired to be operated upon, as well as the type of document that is desired to he accessed (e.g., content, role list, system). Based on this, the authorization station may identify the appropriate role list. The authorization station selects the appropriate role definition within the role list using the user identifier, the application identifier, and the platform identifier specified in the request. Also, the type of credentials used to authenticate are also used to identify the appropriate role definition. Thus, one user using a more secure authentication mechanism may be granted more extensive access than the same user with the same application but using a less secure authentication mechanism.

When the authorization station receives a request from the requesting entity to perform at least one of the command methods, the authorization station then identifies the appropriate role definition. Using this role definition, the authorization station determines access permissions for the requesting entity with respect to the requested action.

The present invention has the advantage of performing authorization in a standardized manner regardless of the target service that is desired. The service is only factored in when selecting an appropriate role map. In addition, this is accomplished while providing a standardized set of templates that may be used for coarse-grained control over access. Thus, applications that are not able to add further refined scopes to the role list may at least have some level of access control over the service's data structures. In addition, those that can define more refined scopes may have those more refined scopes included in the role list documents to allow for more user-specific and refined control over access permissions. These refined scopes may be included in the role list corresponding to the identity whose data is being accessed. Accordingly, the present invention provides for a high level of control over access permissions in a manner that is relatively independent of the underlying service being targeted.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
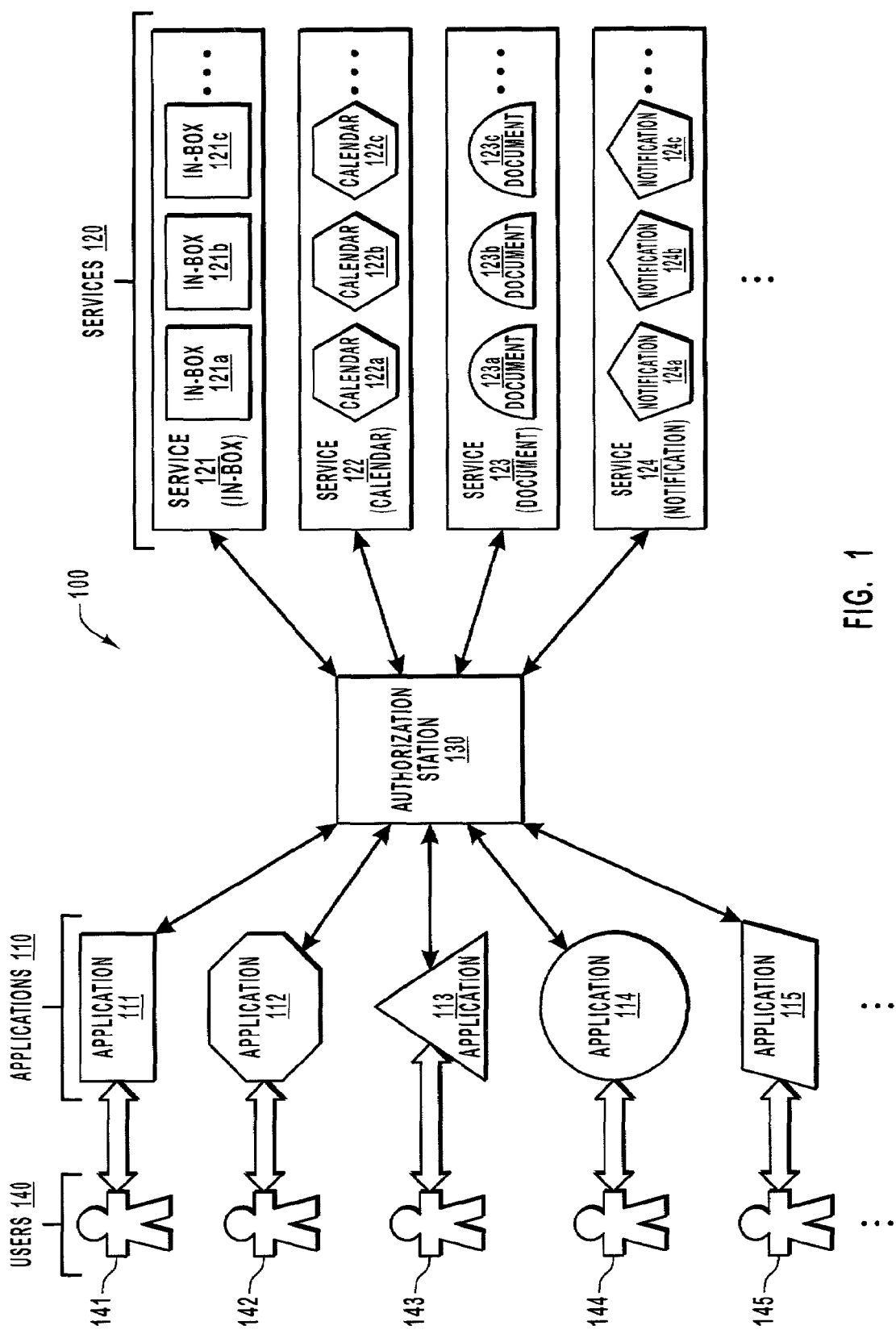
FIG. 1 schematically illustrates a general network environment in which the present invention may be employed.

The present invention extends to methods, systems and computer program products for authorizing a requesting entity in a manner that is at least partially independent of the underlying target data structure that is desired to be accessed. In one operating environment, there are a number of individuals and applications operating through a variety of services on a variety of different types of identity-specific data structures that are organized in accordance with a set of rules. Each service is configured to perform operations on one or more different types of data structures. For example, an identity may have an in-box data structure organized in accordance with an in-box schema and that is managed by an in-box service, a calendar data structure organized in accordance with a calendar schema and that is managed by a calendar service, and so forth.

The principles of the present invention allow for authorization of a requesting entity to occur largely, if not wholly, independent of the type of the underlying data structure that is desired to be operated upon. This allows for a centralized authorization station that performs the entire authorization process for a wide variety of different services. The centralized authorization station may then inform the target service that the requested operation is authorized and provide the service with sufficient information to perform the desired operation on the target data structure.

Embodiments within the scope of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates an example network environment 100 in which the present invention may be employed. The environment includes a variety of applications 110 (including applications 111 through 115) that interact with a variety of services 120 (including services 121 through 124) through an authorization station 130. The applications 111 through 115 may be different types of applications as represented by each being illustrated as a different shape. There are a number of users 140 associated with the applications 110. Specifically, users 141 through 145 are associated with applications 111 through 115, respectively. In this description and in the claims, a "requesting entity" may be a user, an application, a user-application combination, or any of these items in combination with a credential type representing a method of authentication.

The services 120 may manage identity-specific information. For example, service 121 may be an in-box service that manages a number of in-box data structures 121a through 121c that follow an in-box schema as represented by the data structures being squares. Each data structure may belong to a particular identity such as an individual, an organization, a group of individuals, a project, or any other identifiable entity. Through this description. Service 122 may be a calendar service that manages a number of calendar data structures 122a through 122c that follow a different, calendar schema as represented by each data structure being an octagon. Service 123 may be a document service that manages various document data structures 123a through 123c that follow a document schema as represented by each data structure being a half-circle. Service 124 may be a notification service that manages notification data structures 124a through 124c that follow a notification schema as represented by each data structure being a pentagon.

This operating network is just one example of many possible network operating environments in which the present invention may be employed. For example, as represented by the ellipses in FIG. 1, the number of applications 110 and services 120 that interact with the authorization station 130 may vary, In addition, each service may manage more than just one different type of data structure. Furthermore, there is no requirement that the data being managed by the service be identity-specific although that is one specific implementation. Also, many of the services may employ additional authorization functionality not performed by the authorization station 130. Furthermore, although only one centralized authorization station is shown and described for clarity, there may be more than one (and even numerous) authorization stations that perform the described authorization on behalf of the services. And finally, some of the functionality of the authorization station 130 may also be employed instead by the services.

In any case, the principles of the present invention allow for the authorization process to occur largely, if not wholly, independent of the type of data structure desired to be operated upon. Accordingly, a separate and distinct authorization station 130 may provide authorization for requests destined for a variety of different services.

Figure 2:
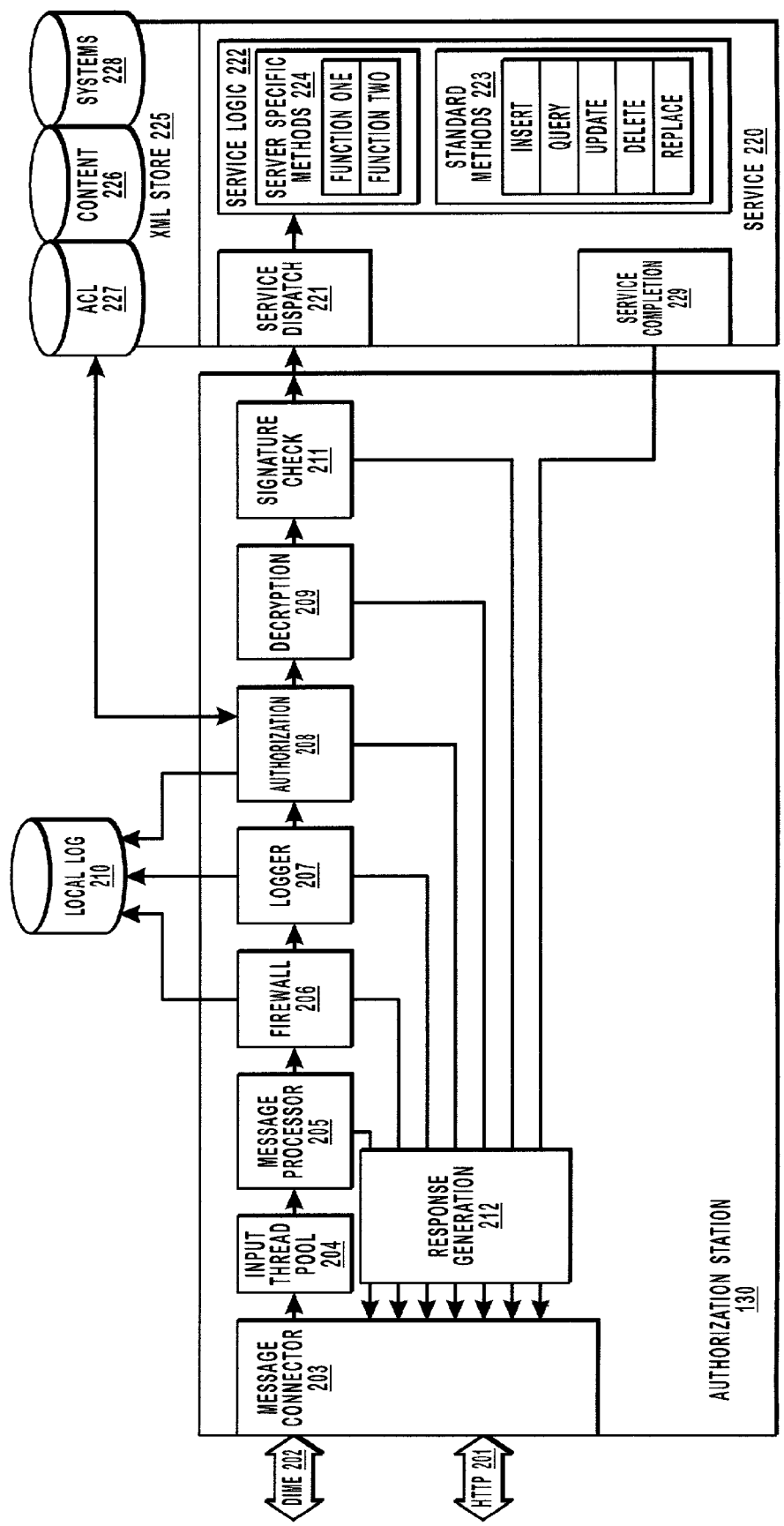
FIG. 2 illustrates a specific example of a network environment in which the present invention may be employed.

FIG. 2 illustrates a more specific diagram of the authorization station and one of the services. The authorization station 130 receives a request from a requesting entity using a network protocol such as HyperText Transport Protocol (HTTP) represented by arrow 201, or Direct Internet Message Encapsulation (DIME) represented by arrow 202. The authorization station 130 includes a message connector 203, which receives the request and passes the message up the protocol stack so that the request may be further processed. The request is then provided to an input thread pool 204 for temporary storage.

The request is then parsed at a message processor 205, which parses the request into various components. For example, in one embodiment, the request is a Simple Object Access Protocol (SOAP) message in which case the message processor 205 parses using the appropriate SOAP protocol. The message processor 205 may also perform some preliminary level of rule checking to make sure the request should be further processed. For example, if the request is to manipulate a data structure that none of the services 120 manage, then the message processor 205 may abstain from passing the request further down the process flow, and instead simply generate an error message using the response generation module 212 to be returned via the message connector 203.

The request may then be filtered by a firewall 206 and then logged using a logger 207. A firewall may also reject a request and generate an error message using the response generation module 212 that is returned as a response. A local log 210 may receive and store event information received from the firewall 206, as well as normal logging information received from the logger 207 such as the following for each received request: time received, method type, attribute types, and address of request. Then, an authorization module 208 determines if the request is authorized to perform the requested operation on the target data structure. More detail regarding this authorization process will be described further below after the complete process flow has been described. If authorization fails, then an error message is returned via the response generation module 212 and the message connector 203.

In one example, the request is in the form of a SOAP envelope, which contains unencrypted header information, as well as an optional encrypted body portion. A decryption module 209 decrypts the body of the request. Then, a signature checker 211 checks any signatures associated with the request to guard against tampering. Any failed decryption or signature checking may also be returned to the requestor in the form of an error message generated by the response generation module 212.

After signature checking, the authorization station 130 then passes information sufficient to accomplish the requested operation to the appropriate target service. This information includes a message that the request is authorized, the scope of access permissions, an identification of the requested method, and any needed request details.

Suppose that the target service is the service 121 referred to in FIG. 1. The information is passed to the service dispatch module 221 of the service 121. The service logic 222 then receives and processes the information. The service logic 222 is capable of performing standard methods 223. An example a standard method set includes insert, query, update, delete, and replace as illustrated. The service logic 222 may also include some service-specific methods 224.

In order to execute the requested operation, the service logic accesses a data store that stores the data structures to be manipulated. In one embodiment, the data structures to be operated upon are eXtensible Markup Language (XML) documents in which case the data store is an XML data store 225. The data structures to be accessed may be content documents 226 that contain the actual content of primary interest to the application or user. As an example, such content documents may be any of the data structures listed in FIG. 1 such as in-box, calendar, document, and notification data structures.

The service may also manipulate role list documents 227. Role list documents 227 define access privileges to a specific identity's data given a particular role assigned to the requestor. The authorization module 208 of the authorization station communicates with the role list document 227 when authorizing the requesting entity. More regarding the role lists documents will be described in fiber detail below. The service may also manipulate system documents 228 that define system-related information.

Once the requested operation is performed on the target data structure using the service logic 222 interacting with the XML store 225, response information is provided to service completion module 229. The response information is then passed to response generation module 212 for generation of an appropriate response. The response is then returned to the user via the message connector 203.

Figure 3:
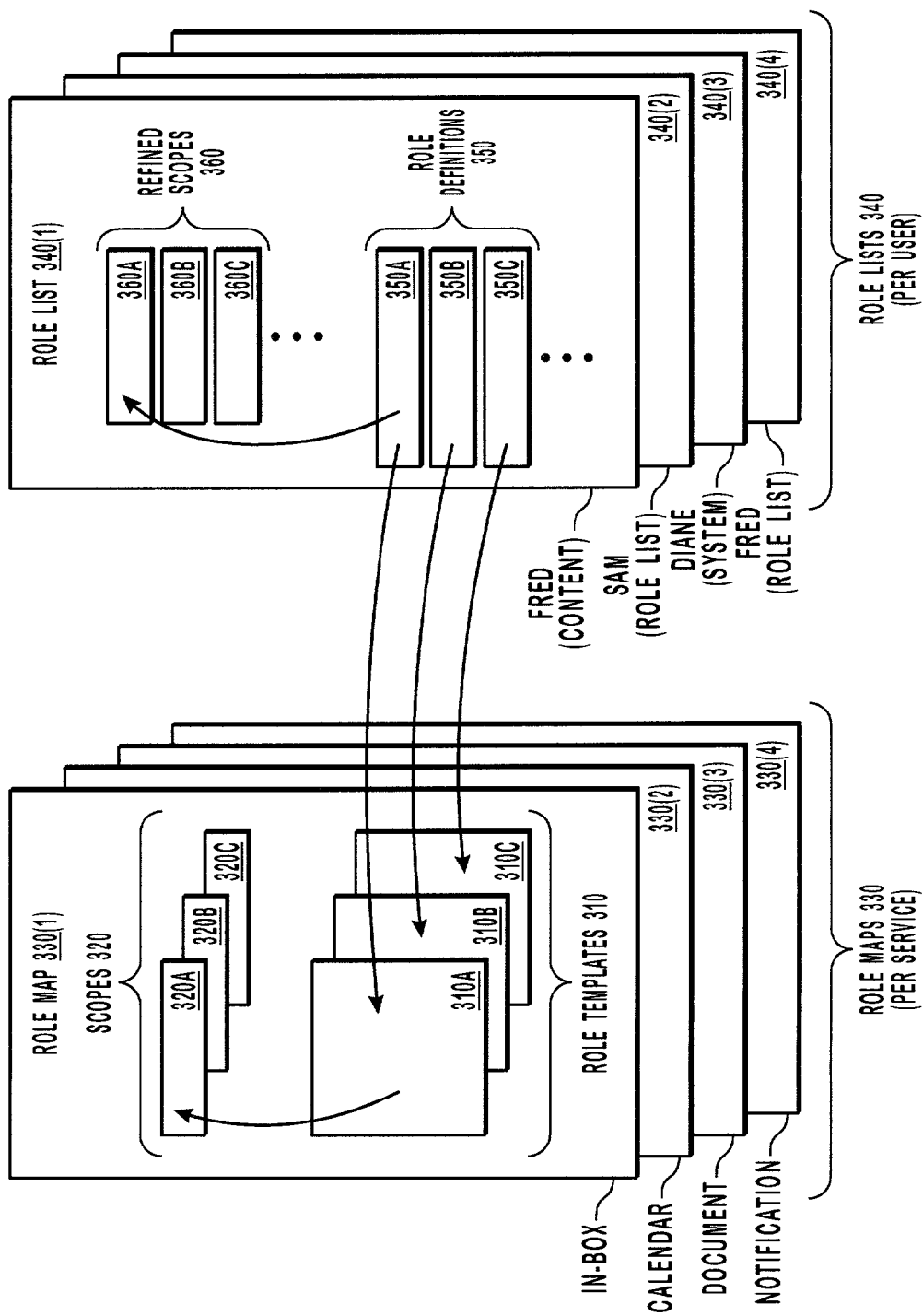
FIG. 3 illustrates data structures including a role list data structure linked by reference with a role map data structure, the data structures being used to authorize a requestor to perform certain actions on identified data structures.

FIG. 3 illustrates a number of role lists 340 including role list documents 340(1) through 340(4). Each role list is specific to a particular identity who owns data structures stored by the service. Each identity may have content documents, role list documents, and system documents. The role list document governs access to each type of document (i.e., content, system, and even role list documents) for each identity. For the sake of discussion, suppose that the top role list controls access to content documents belonging to Fred. Each role list includes a number of role definitions such as role definitions 350A, 350B, 350C and so forth, that each define access privileges for entities that may potentially request to operate on Fred's content data structures.

The role definitions 350 define access privileges using role templates 310. FIG. 3 illustrates three role templates 310A, 310B and 310C. In one example, the role definition uses the role templates by directly including the role template, or (as illustrated) by instead referring to the role template.

Figure 4:
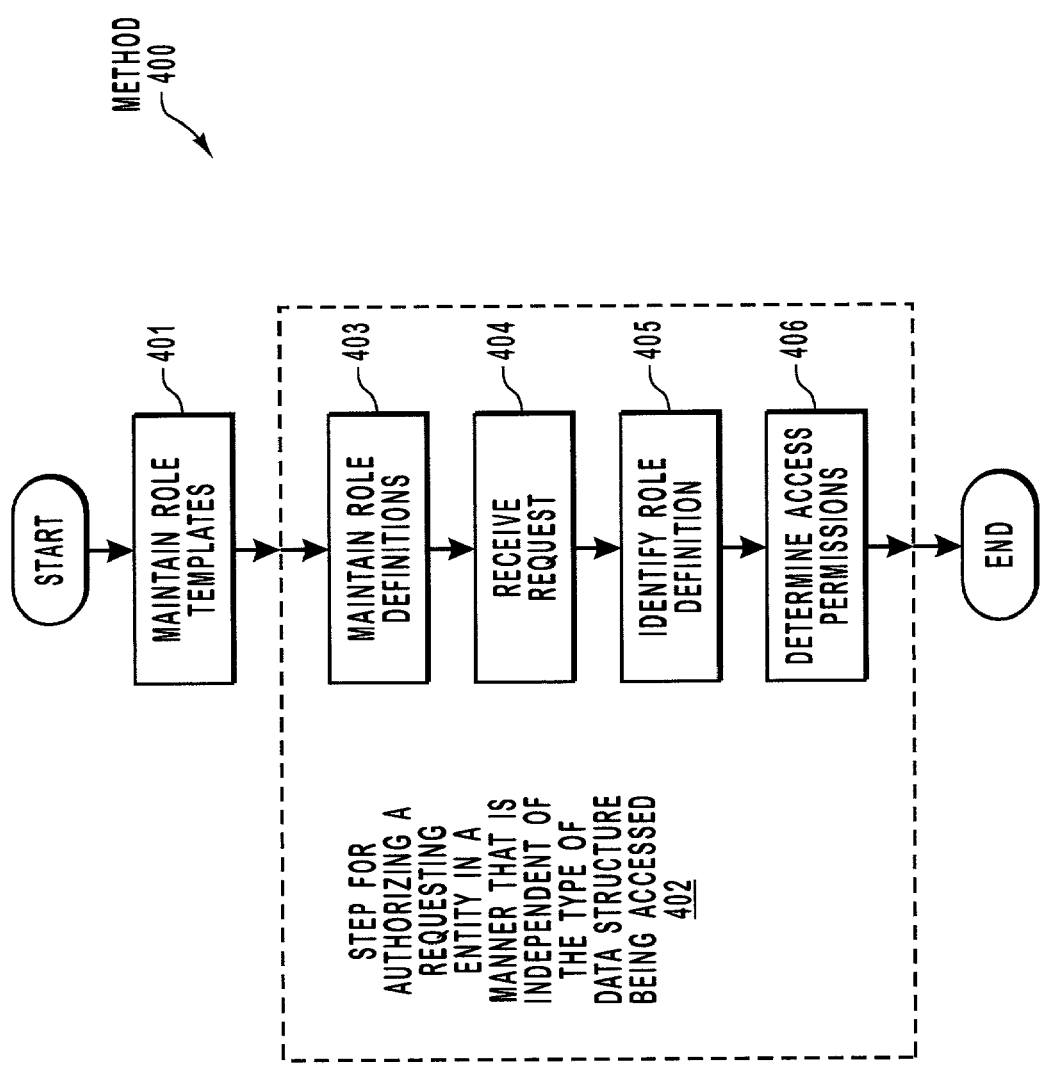
FIG. 4 illustrates a flowchart of a method for authorizing a requestor to perform certain actions on the identified data structure.

FIG. 4 illustrates a method 400 for authorizing a requesting entity to operate upon a data structure in a standard manner that is at least partially, if not wholly, independent of the type of underlying data structure being operated upon. The method 400 first includes an act of maintaining a number of role templates (act 401) that each define basic access permissions with respect to a number of command methods, wherein at least some of the role templates define access permissions in a manner that is independent of the type of data structure being accessed. In FIG. 2, these role templates may be maintained in, for example, the role list documents 227 at the XML store 225.

In order to understand how the role definitions define access privileges in one embodiment, this description will now describe scopes, role templates, role maps, and role definitions in that order with respect to a specific example. Scopes 320 (e.g., scopes 320A, 320B, and 320C) define general views on data using a standardized language. The following defines a schema or set of rules regarding how to structure a "scope" XML element in one embodiment. Throughout the following examples, an "hs" as in <hs: scope ... >represents the namespace or schematic that may be used to interpret the corresponding element. A "namespace" may be, for example, a namespace as defined in the "Namespaces in XML" specification published by the World Wide Web Consortium (or "W3C").

```
<hs:scope id="...">
    <hs:name xml:lang="..." dir="...">0..unbounded</hs:name>
    <hs:shape base="...">1..1
        <hs:include select="...">0..unbounded</hs:include>
        <hs:exclude select="...">0..unbounded</hs:exclude>
    </hs:shape>
</hs:scope>
```

The "scope" element defines a scope, which may be referred by a role definition to indicate what portions of the document are visible to that role definition for a specified method. The "scope/@id" attribute of the "scope" element is a globally unique identifier that is assigned to identify the scope. The identifier may be assigned by the authorization station 130, or may be manually set or overridden by an application when the scope is generated.

The "scope/name/@xml:lang" attribute is used to specify an ISO 639 language code or an ISO 3166 country code as described in RFC 1766. ISO is short for "International Organization for Standardization". RFC is a "Request For Comment" that comprises a series of notes (usually Internet-based notes) about a certain topic. The value of this attribute indicates the language type of the content within this element. The "scope/name/@dir" optional attribute specifies the default layout direction for any localized string specified in any select attribute within the "scope" element (e.g., right to left, or left to right). Other elements also have these "@xml:lang" and "@dir" attributes for equivalent purposes.

The "scope/shape" element defines the visible node set of the document when operating through this "scope" element. The "scope/shape/@base" attribute specifies the initial set of nodes visible through the shape. A value of "t" indicates that the shape is initialized to include all possible nodes relative to the shape that is currently in effect. In other words, when defining a shape for a role, the value "t" indicates all possible nodes are available in the specified document. The value "nil" indicates the empty node set.

The "scope/shape/include" element specifies the set of nodes that should be included into the shape relative to the possible set of nodes indicated by the base attribute. The "scope/shape/include/@select" attribute specifies an XPATH expression that selects a set of nodes relative to the externally established context. "XPATH" is a standard published by the World Wide Web Consortium (or "W3C") and may be, for example, XML Path Language (XPATH) Version 1.0 or later. The "scope/shape/exclude" element specifies the set of nodes that should be excluded from the shape relative to the possible set of nodes indicated by the base attribute. The "scope/shape/exclude/@select" attribute specifies an XPATH expression that selects the set of nodes to exclude.

In order to better understand this schema, two examples of "scope" elements will now be listed and described. As a first example, consider the following "scope" XML element.

```
<scope id="1">
    <shape base="t"/>
</scope>
```

The first and third line of this XML element define the XML element as being a "scope". The attribute id="1" in the first line assigns the scope with an identifier "1". The second line defines a shape that may be used to define the scope. Here the base attribute of the shape is assigned a value of "t" indicating that the shape base starts with all nodes in the target data structure. Furthermore, since there are no "exclude" elements within the "shape" element, the shape remains the entire node set. This scope will thus be referred to as the "all data" scope.

Now consider the following second example of a "scope" element.

```
<scope id="2">
    <shape base="nil">
        <include select="/*[cat/@ref="public"]/>
    </shape>
</scope>
```

The attribute id="2" in the first line assigns the scope with an identifier "2". The second line defines a shape with a base attribute assigned a value of "nil" indicating that the shape base starts with no nodes in the target data structure. The "include" element in the third line indicates that all nodes that satisfy the XPATH statement in its "select" attribute are to be added to the shape base to define the shape. In this case, the "include" element specifies that the shape includes all of the nodes that have a "cat" element having a "ref" attribute of value "public" (in other words, all public nodes) are to be included in the shape. Such scopes will thus be referred to as the "only public items" scope. The "cat" element provides for categorization of the element by whatever categorization is useful for the containing element. The "ref" attribute provides for a particular categorization value. Thus, scopes define a general view on data that is limited to public items.

Referring to FIG. 3, there are also role templates 310. The role templates 310 define general access permissions for each method (e.g., for each standard method 223 and/or each service specific method 224). In one embodiment, the role templates are XML documents that follow the following schema:

```
<hs:roleTemplate name="..." priority="...">0..unbounded
    <hs:fullDescription
        xml:lang="..." dir="...">0..1</hs:fullDescription>
    <hs:method name="..." scopeRef="...">0..unbounded</hs:method>
</hs:roleTemplate>
```

This "roleTemplate" element defines the maximum scope of information, and the allowable methods used to access that information for each request mapped into the template. The "roleTemplate/@name" attribute specifies the name of the role template. The "roleTemplate/@priority" attribute specifies the priority of the role template should multiple role templates apply to a particular requesting entity, thus facilitating selection of a single role template. The "roleTemplate/fullDescription" element contains a description of this role template which specifies the capabilities a caller will have when accessing information through this role template.

The "roleTemplate" element may include multiple "method" elements. Each "method" element specifies access privileges available when using a specific method. When a requesting entity maps to a role template, the method in the request must match one of these elements for the message to continue to flow. If the method exists, the data available to the method is a function of the scope referenced by this method combined with an optional scope referenced by the role definition included in the role list. The combining of the method scope with the optional scope will be explained in further detail below.

The "roleTemplate/method/@name" attribute specifies the name of the method. The "roleTemplate/method/@scopeRef" specifies the scope that is in effect for this method. The scope referred within the method element is in the same role map as the role template that contains the method element.

Four examples of "roleTemplate" XML documents will now be listed and described. Consider the first example as follows:

```
<roleTemplate name="rt0">
    <method name="query" scopeRef="1"/>
    <method name="insert" scopeRef="1"/>
    <method name="replace" scopeRef="1"/>
    <method name="delete" scopeRef="1"/>
    <method name="update" scopeRef="1"/>
</roleTemplate>
```

This role template is assigned a name "rt0". In this example role template, five "method" elements are listed, one for each of the standard methods 223. Each of these methods is assigned the scope with an identifier of "1", which was the "all data" scope. Accordingly, this role template allows fill access for all of the standard methods. Accordingly, this role template will often be referred to as the "full access" role template.

Consider the following second example of a role template:

```
<roleTemplate name="rt1">
    <method name="query" scopeRef="1"/>
</roleTemplate>
```

This role template is assigned a name "rt1". In this example role template, there is only one "method" element, which references the "query" method. The "all data" scope having the identifier "1" is assigned to this method. Accordingly, the role template facilitates querying of all the data, but no other operations on any data. Accordingly, this role template will also be referred to as the "full read-only" role template.

Consider the following third example of a role template:

```
<roleTemplate name="rt2">
    <method name="query" scopeRef="2"/>
</roleTemplate>
```

This role template is assigned a name "rt2". In this example role template, there is again only one "method" element, the "query" method. The "only public items" scope having the identifier "2" is assigned to this method. Accordingly, the role template facilitates only the querying of only public items. Accordingly, this role template will be referred to as the "limited read-only" role template.

Consider the fourth and final example of a role template:

```
<roleTemplate name="rt99"/>
```

This role template is assigned a name "rt99". In this example role template, there are no "method" elements. Accordingly, the role template does not facilitate any operations on any data at all. Accordingly, this role template will be referred to as the "no access" role template.

Referring to FIG. 3, note that the scopes 320 and the role templates 310 are included within a single role map 330(1). In an example, the role maps 330 include several role maps, one for each service. For example, the role map 330(1) corresponds to an in-box service, the role map 330(2) corresponds to a calendar service, the role map 330(3) corresponds to a document service, and the role map 330(4) corresponds to the notification service.

In accordance with the example, the role maps follows the following schema:

```
<hs:roleMap
changeNumber="..." id="..." creator="..." xmlns:hs="http://....">1..1
    {Scope}"...">0..unbounded
    {Role Template}>0..unbounded
</hs:roleMap>
```

As illustrated in FIG. 3 and as listed in the above schema, a role map may contain any number of scopes and role templates. Any bracketed items represent structures that have been previously described. For example, the "{Scope}" item listed in the above example represents a scope element that follows the scope schema described above. Thus, "{Scope}" . . . ">0 . . . unbounded" represents that there may be any number of such scope elements inserted at that part of the role map. Similarly, "{Role Template}. . . >0 . . . unbounded" represents that there may be any number of role template elements inserted at that part of the role map, the role templates being data structures that follow the role template schema described above.

The "roleMap/@changeNumber" attribute facilitates caching of the element and its descendants. The "roleMap/@id" attribute is a globally unique identifier assigned to this element. Application software may also override this identifier generation by specifying such in the request message The "/roleMap/@creator" attribute identifies the creator in terms of a user identifier, an application identifier, and a platform identifier of the role map.

The following is an example of an XML role map that includes the two example scopes and the four example role templates listed above.

```
<roleMap>
    <!--all data scope-->
    <scope id="1">
        <shape base="t"/>
    </scope>
    <!--only public items scope-->
    <scope id="2">
        <shape base="nil">
            <include select="/*[cat/@ref="public"]/>
        </shape>
    </scope>
    <!--full access-->
    <roleTemplate name="rt0">
        <method name="query" scopeRef="1"/>
        <method name="insert" scopeRef="1"/>
        <method name="replace" scopeRef="1"/>
        <method name="delete" scopeRef="1"/>
        <method name="update" scopeRef="1"/>
    </roleTemplate>
    <!--full read-only (query method)-->
    <roleTemplate name="rt1">
        <method name="query" scopeRef="1"/>
    </roleTemplate>
    <!-- limited read-only -->
    <roleTemplate name="rt2">
        <method name="query" scopeRef="2"/>
    </roleTemplate>
    <!--no access-->
    <roleTemplate name="rt99"/>
</roleMap>
```

In summary, the role map defines general access permissions using role templates that refer to scopes. In one embodiment, role templates are generated that are representative of typical access permissions that might be desired by users using the particular service. Referring to FIG. 4, the authorization station maintains these role templates and thus accomplishes the act of maintaining a number of role templates (act 401) that each define basic access permissions with respect to a number of command methods, wherein at least some of the role templates define access permissions in a manner that is independent of the type of data structure being accessed. Note that the target service is only factored in when selecting a role map to use. The process then remains the same regardless of the target service.

The method 400 then includes a step for authorizing a requesting entity using the role templates in a manner that is independent of the type of data structure being accessed (step 402). This may include any corresponding acts for accomplishing this functional purpose. However, in the example of FIG. 4, this includes corresponding acts 403, 404, 405 and 406.

For example, the method 400 includes an act of maintaining a number of role definitions (act 403) that each define access permissions for specific entities by using one or more of the role templates. While the role definitions may take any form; in one example, the role definition takes the form of a "role" XML element that is contained within a "role list" element. In this example, each of the role lists 340 (e.g., role lists 340(1) through 340(4)) applies to a specific identity and to a specific type of document (e.g., content). For example, the role list 340(1) may apply to Fred's content data, role list 340(2) may apply to Sam's role list data, role list 340(3) may apply to Diane's system data, and role list 340(4) may apply to Fred's role list data. Referring to the role list 340(1), the role list includes a number of refined scopes 360 including refined scopes 360A, 360B and 360C. The role list 340(1) also includes several role definitions 350A, 350B and 350C.

The following is an example schema for a role list.

```
<hs:roleList changeNumber="..." instanceId="..." xmlns:hs="http://...">1..1
    {scope}>0..unbounded
    <hs:role scopeRef="..."  roleTemplateRef="..."  changeNumber="..."  id="..."
                    creator="...">0..unbounded
        <hs:cat ref="...">0..unbounded</hs:cat>
        <hs:notes xml:lang="..." dir="...">0..unbounded</hs:notes>
        <hs:subject userId="..." credType="..." appAndPlatformId="...">1..1</hs:subject>
        <hs:expiresAt>0..1</hs:expiresAt>
        {any}
    </hs:role>
</hs:roleList>
```

The "role list" contains a number of scopes that allow for more fine-grained defining of scopes. The scopes may follow the same scope schema that was described further above. The role list also includes any number of role definitions in the form of "role" elements. The various elements and attributes will now be described.

the "roleList/@changeNumber" attribute facilitates caching of the element and its descendants. The "roleList/@instanceId" attribute is a unique identifier typically assigned to the root element of a service. The "rolelist/role" is a role definition that matches a particular requesting entity with particular access rights. These access rights are defined by any applicable scope referred to in any applicable role template, along with any scope directly referred to in the role definition itself.

The "roleList/role/@scopeRef" attribute specifies the scope in the role list that is in effect for this role definition. The "roleList/role/@roleTemplateRef" attribute specifies the name of the role template in the service's role map that this role definition is bound to. The "roleList/role/@changeNumber" attribute is designed to facilitate caching of the element and its descendants. The "/roleList/role/@id" attribute is a globally unique ID assigned to this element. The "roleList/role/@creator" attribute identifies the creator in terms of user identifier, application identifier, and platform identifier. The "roleList/role/cat" categorizes the element that contains it by referencing a global category. The "roleList/role/notes" specifies notes that may be used to specify reasoning being adding this role to the roleList.

The "roleList/role/subject" element identifies the requesting entity to whom the role definition is to apply. The requesting entity may be defined by a user identifier, an application identifier, and a platform identifier, each represented by attributes within the "subject" element. The role definition may also be dependent on the credential types provided by the request. Hence, the presence of the credType attribute within the "roleList/role/subject" element.

Specifically, the "roleList/role/subject/@userId" attribute specifies an authenticated user identifier. The "roleList/role/subject/@credType" attribute specifies a credential type value that represents the type of credential used to authenticate the user identifier. The "roleList/role/subject/@appAndPlatformId" Attribute specifies the authenticated identifier of an application-platform combination. These attributes combine to define a requesting entity.

The "roleList/role/expiresAt" element specifies a time after which the requesting entry is no longer considered valid for matching purposes. The "/roleList/role/{any}" portion allows for the role list schema to be extended at that location.

Referring to FIG. 4, by maintaining these role definitions in the form of a role list, the authorization station 130 may accomplish the act of maintaining a number of role definitions (act 403). For the sake of clarity, a specific example of an XML role list that follows the above described "role list" schema is now listed and will be described.

```
<roleList>
    <!--only golf related stuff-->
    <scope id="1">
        <shape base="nil">
            include select="/*[cat/@ref="golf"]/>
        </shape>
    </scope>
    <role roleTemplateRef="rt0">
        <subject    userId="puid-of:fred"    appAndPlatformId="puid-
                        of:calendar@contoso.com"/>
    </role>
    <role roleTemplateRef="rt1">
        <subject    userId="puid-of:fred"    appAndPlatformId="puid-
                        of:calendar@fabrikam.com"/>
    </role>
    <role scopeRef="1" roleTemplateRef="rt2">
        <subject userId="puid-of:barry"/>
    </role>
    <role roleTemplateRef="rt99">
        <subject userId="ALL_USERS" appAndPlatformId="puid-of:app@cpandl.com"/>
    </role>
</roleList>
```

This role list includes one refined "scope" element and four "role" elements. The first "role" element means: fred running calendar@contoso.com can access all information, through all methods. Recall that role template "rt0" allows access to all information through all methods. The second "role" element means: fred running calendar@fabrikam.com only has read-only access to all information. The third "role" element means: barry running any application has read-only access to only public information, but only those pieces of public information that are categorized as golf related. This last access stipulation represents a refinement that was added to this role list to allow for more fine-grained control over access privileges. It is accomplished by reference to the local refined scope listed at the beginning of the role list. The last "role" element means: any and all users running the app@cpandl.com application have no access to any information held within this service.

The method 400 then includes an act of receiving a request from the requesting entity to perform at least one of the command methods, the request identifying the requesting entity (act 404). In one embodiment, the request identifies, at least in encrypted form, the user identifier, the application identifier, the platform identifier, and the credential type identifier.

The method 400 then includes an act of identifying a role definition corresponding to the requesting entity (act 405). First, the appropriate role list is identified by identifying the owner and type (e.g., content, role list, system) of the target data structure. Then, the user identifier, application identifier, platform identifier, and credential type identifier received in the request is matched against those similar fields in the "subject" element of the role definition. This may be accomplished via a database lookup.

The matching process may be as follows. In a first matching operation, the user identifier in the message is matched against "userId" attributes in the "subject" element of the role definitions to find a first set of matching role definitions. Once this first set of matching role definitions is identified, a second match operation is performed. In this second matching operation, the credential type identifier associated with the request is matched with the "credType" attribute in the "subject" element of the first set of role definitions to narrow to a second set of matching role definitions. If there are no role definitions in the second set of role definitions, then all role definitions from the first set having a "subject" elements containing the "credType" attribute are discarded keeping only those "subject" elements that do not contain a "credType" attribute to form the second set of role definitions.

Then, a third matching operation is performed in which the combined platform identifier and application identifier of the request are matched against the "appAndPlatformId" attribute of the second set of role definitions. This generates a third set of role definitions. If there are no role definitions in the third set of role definitions, then all role definitions from the second set having a "subject" elements containing the "appAndPlatformId" attribute are discarded keeping only those "subject" elements that do not contain an "appAndPlatformId" attribute to form the third set of role definitions. If a matching role element is not found, the request is failed with an authorization fault. Also, if the matching role definition contains an "expiresAt/" element that indicates that the role definition has expired, then an error message is also returned.

Note that the role list structure allows for different role definitions even for the same user and the same application should the user authenticate using different authentication methods and thus create different credential type identifiers. Thus, a user authenticating using a more secure authentication mechanism may be granted more extensive access than the same user using a less secure authentication mechanism.

The role list lookup may be farther optimized through the use of licenses. When an application sends a message containing an identity license, the authorization station 130 finds a role template and a refined, local scope corresponding to the request as described above. The authorization station 130 then places this in the request as an "authorized role". Once the request has been fulfilled, the authorization station 130 sends a response back which includes an <authorizedRole/> element. When the application sends a subsequent request back to the same service, the request includes both the identity license and the authorized role license. During authorization, the authorization station 130 notices the authorized role license, and determines that it is valid and that it was properly issued to the identity sending the message. The authorization station 130 then uses the information contained within the authorized role element (i.e., the appropriate role template with the refined, local scope), instead of once again accessing the role list database. Thus, a database lookup process is avoided for subsequent accesses to the same service.

The method 400 includes an act of determining access permissions for the requesting entity with respect to the command method using the role definition corresponding to the requesting entity (act 406). In order to accomplish this, the role templates in the service's role map are extracted and only the highest priority role template is kept. The specified command method is compared with the applicable role template to determine if the method is allowed. If it is not allowed, then an error message is returned. If the method is allowed, then the scope corresponding to that method (as referred to in the role template) is combined with any refined scope referenced by the role definition found within the role list. This information is then passed to the target service along with an authorization to proceed.

The present invention has the advantage of performing authorization in a standardized manner regardless of the target service that is desired. The service is only factored in when selecting an appropriate role map.

In addition, this is accomplished while providing a standardized set of templates that may be used for coarse grained control over access. Thus, applications that are not able to add further refined scopes to the role list may at least have some level of access control over the service's data structures. Furthermore, those applications that can define more refined scopes may have those more refined scopes included in the role list documents to allow for more user-specific and refined control offer access permissions. Accordingly, the present invention provides for a high level of control over access permissions in a manner that is relatively independent of the underlying service being targeted.

As a final advantage, note that scopes define views on a document. Thus, unlike conventional access control lists, the present invention facilitates access granularities below the document level. In other words, portions of documents may be viewed or operated upon, while other portions remain secure.

Having now described the principles of the present invention in detail, it is noted that the precise hardware configuration that implements the above-described features is not important to the present invention. For example, it is not important to the principles of the present invention where the authorization station 130 or services 120 are implemented.

Figure 5:
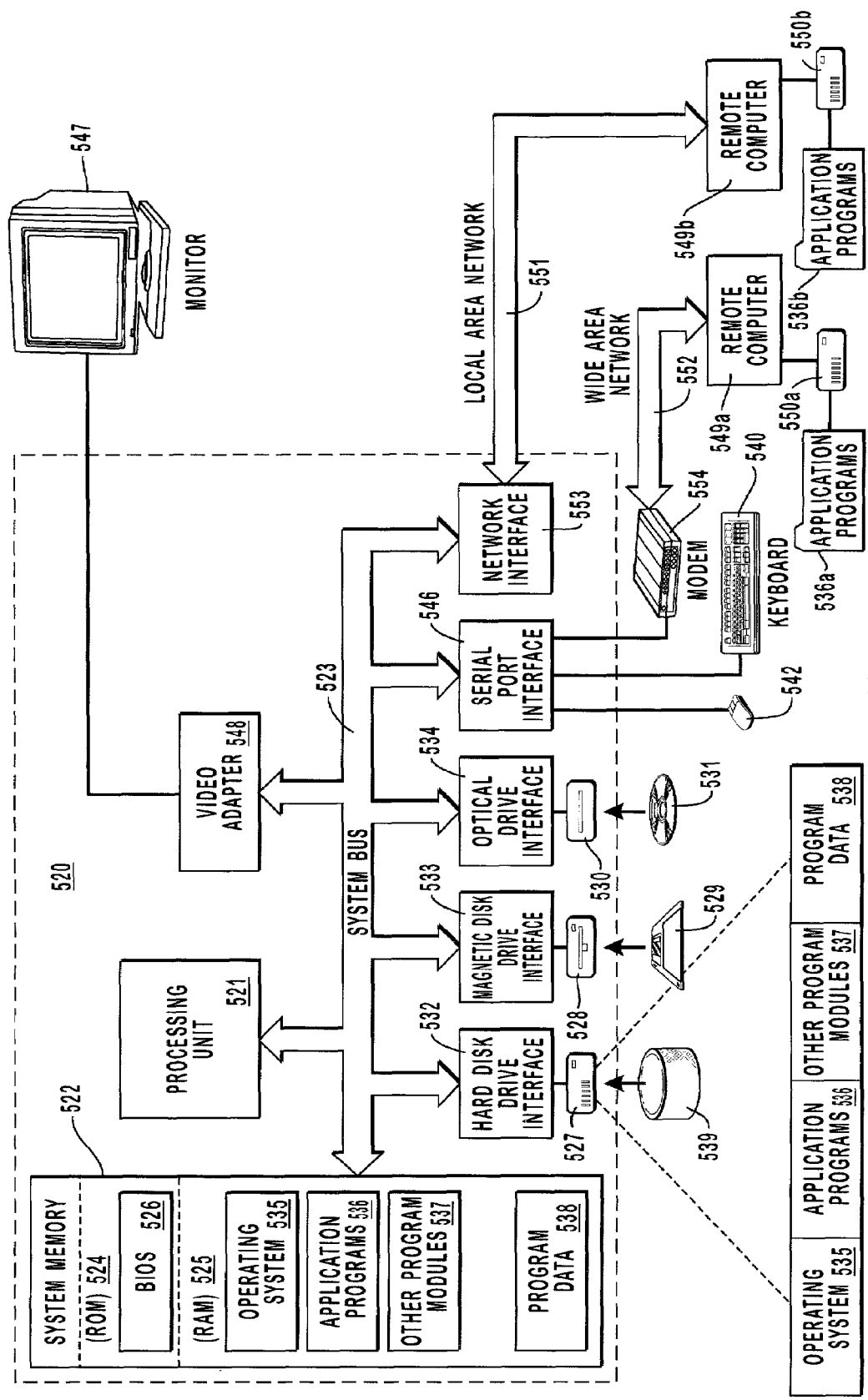
FIG. 5 schematically illustrates a computing device that may implement the features of the present invention.

Nevertheless, for the sake of completeness, FIG. 5 illustrates an example computing system that may itself or in combination with other computing devices implement all or portions of the features described above. The example system includes a general purpose computing device in the form of a conventional computing device 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538.

A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

Accordingly, the principles of the present invention allow for authorization of requesting entities in a manner that is largely independent of the underlying service being targeted. Accordingly, the authorization process may be performed as a centralized function while the services are left without having to perform significant authorization processes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network that includes different types of data structures of one or more specific entities, a method for authorizing a requesting entity to operate upon data structures in a standard manner, the method comprising:
    an act of maintaining a plurality of role templates that define basic access permissions with respect to one or more command methods, wherein at least some of the role templates define the basic access permissions in a manner that is independent of the type of data structure being operated upon, and wherein the plurality of role templates are contained within a plurality of role map documents, each role map document being specific to a particular computerized service that is configured to perform computerized operations on data structures;
    an act of maintaining a plurality of role definitions that define access permissions for requesting entities by using one or more of the role templates;
    an act of receiving a request from the requesting entity to perform at least one of the command methods, the request identifying the requesting entity as well as an application-platform identifier corresponding to an application of the computerized service;
    an act of identifying a role definition corresponding to the requesting entity; and
    an act of determining access permissions for the requesting entity with respect to the command method using the role definition corresponding to the requesting entity.

2. A method in accordance with claim 1, wherein the act of maintaining a plurality of role definitions that define access permissions for specific entities comprises:

an act of the role definition corresponding to the requesting entity using at least one access permission that is specific to the requesting entity, wherein the at least one access permission for the requesting entity is defined by the one or more role templates that are used by the corresponding role definition as well as the access permission that is specific to the requesting entity.

3. A method in accordance with claim 1, wherein the request includes an identification of credentials used to authenticate the requesting entity, wherein the role definition corresponding to the requesting entity is identified using the credential identification, wherein different role definitions may apply depending on the credentials.

4. A method in accordance with claim 1, wherein the act of maintaining a plurality of role templates that define basic access permissions comprises the following:

an act of maintaining the at least one role map documents that contains all of the role templates for a particular service.

5. A method in accordance with claim 4, wherein the act of maintaining a role map document that contains all of the role templates for a particular service comprises the following:

an act of defining one or more scopes that describe views on a data structure, the one or more scopes being defined independent of the plurality of role templates; and an act of defining a role template by associating a method type with one of the one or more scopes.

6. A method in accordance with claim 4, wherein the act of maintaining a role map document that contains all of the role templates for a particular service comprises the following:

an act of maintaining a role map document as a hierarchical data structure.

7. A method in accordance with claim 4, wherein the act of maintaining a role map document that contains all of the role templates for a particular service comprises the following:

an act of maintaining a role map document as an XML document.

8. A method in accordance with claim 1, wherein the act of maintaining a plurality of role definitions that define access permissions for specific entities by using one or more of the role templates comprises the following:

an act of maintaining one or more role list documents that contain all of the role definitions for requesting entities that may attempt to access data structures belonging to an identity.

9. A method in accordance with claim 8, wherein the act of maintaining a role list document comprises the following:

an act of defining a role definition by referencing a role template included in a role map document, the role map being distinct from the role list.

10. A method in accordance with claim 9, wherein the act of maintaining a role list document comprises the following:

an act of maintaining a role list document as a hierarchical data structure.

11. A method in accordance with claim 9, wherein the act of maintaining a role list document comprises the following:

an act of maintaining a role list document as an XML document.

12. A method in accordance with claim 1, wherein the act of receiving a request from the requesting entity to perform at least one of the command methods comprises the following:

an act of receiving a request from the requesting entity to insert a portion into the data structure.

13. A method in accordance with claim 1, wherein the act of receiving a request from the requesting entity to perform at least one of the command methods comprises the following:

an act of receiving a request from the requesting entity to delete a portion from the data structure.

14. A method in accordance with claim 1, wherein the act of receiving a request from the requesting entity to perform at least one of the command methods comprises the following:

an act of receiving a request from the requesting entity to update a portion of the data structure.

15. A method in accordance with claim 1, wherein the act of receiving a request from the requesting entity to perform at least one of the command methods comprises the following:

an act of receiving a request from the requesting entity to replace a portion of the data structure.

16. A method in accordance with claim 1, wherein the act of receiving a request from the requesting entity to perform at least one of the command methods comprises the following:

an act of receiving a request from the requesting entity to query regarding a portion of the data structure.

17. A method as recited in claim 1, wherein the one or more command methods comprise a set including insert, delete, query, update, and replace.

18. A method as recited in claim 1, wherein the data structure represents in-box information.

19. A method as recited in claim 1, wherein the data structure represents calendar information.

20. A method as recited in claim 1, wherein the data structure represents document information.

21. A method as recited in claim 1, wherein the data structure represents notification information.

22. A method as recited in claim 1, wherein the data structure represents content information.

23. A method as recited in claim 1, wherein the data structure represents role list information.

24. A method as recited in claim 1, wherein the data structure represents system information.

25. A method as recited in claim 1, wherein the act of identifying a role definition corresponding to the requesting entity comprises:

an act of identifying the role definition by searching a database.

26. A method as recited in claim 1, wherein the act of identifying a role definition corresponding to the requesting entity comprises:

an act of identifying the role definition based on authorized role information provided within the request.

27. A method as recited in claim 26, wherein the authorized role information includes an identification of a role template.

28. A method as recited in claim 27, wherein the authorized role information further includes an identification of at least one refined, local scope for modifying the role template.

29. In a computer network that includes different types of data structures of one or more specific entities, a method for authorizing a requesting entity to operate upon data structures in a standard manner, the method comprising:

an act of maintaining a number of role templates within a plurality of role map documents that are each specific to a computerized service that is configured to perform computerized operations on data structures, the role templates defining basic access permissions with respect to a number of command methods, wherein at least some of the role templates define the basic access permissions in a manner that is independent of the type of data structure being operated upon; and a step for authorizing a requesting entity using the role templates in a manner that is independent of the type of data structure being accessed.

30. A method in accordance with claim 29, wherein the step for authorizing a requesting entity using the role templates comprises the following:

an act of maintaining a plurality of role definitions that define access permissions for receiving entities by using one or more of the role templates;

an act of receiving a request from the requesting entity to perform at least one of the command methods, the request identifying the requesting entity as well as an application-platform identifier corresponding to an application of the computerized service;

an act of identifying a role definition corresponding to the requesting entity; and an act of determining access permissions for the requesting entity with respect to the command method using the role definition corresponding to the requesting entity.

31. A method as recited in claim 29, wherein the act and step are performed by a processor executing computer-executable instructions embodied within a physical computer-readable medium.

32. A computer program product for use in a computer network that includes different types of data structures of one or more specific entities, the computer program product for implementing a method for authorizing a requesting entity to operate upon data structures in a standard manner, the computer program product comprising one or more computer-readable storage media have stored thereon the following:

computer-executable instructions for maintaining a plurality of role templates that define basic access permissions with respect to one or more command methods, wherein at least some of the role templates define the basic access permissions in a manner that is independent of the type of data structure being operated upon, and wherein the plurality of role templates are contained within a plurality of role map documents, each role map document being specific to a particular computerized service that is configured to perform computerized operations on data structures;

computer-executable instructions for maintaining a plurality of role definitions that define access permissions for receiving entities by using one or more of the role templates;

computer-executable instructions for detecting the receipt of a request from the requesting entity to perform at least one of the command methods, the request identifying the requesting entity as well as an application-platform identifier corresponding to an application of the computerized service;

computer-executable instructions for identifying a role definition corresponding to the requesting entity; and computer-executable instructions for determining access permissions for the requesting entity with respect to the command method using the role definition corresponding to the requesting entity.

33. In a computer network that includes different services, applications, and an authorization station, the applications submitting requests to perform operations on different data structures managed by the different services, a system for isolating the authorization process from the services so that the services need not independently authorize each request they receive from the number of applications, the system comprising:

a plurality of computerized services that are configured to perform computerized operations on data structures;

an authorization station configured to receive requests from a number of applications to operate upon data structures managed by any of the number of services, the authorization station configured to perform the following:

receive a request from a requesting entity to perform a target operation upon a target data structure managed by a target service, wherein the request includes an application-platform identifier corresponding to an application of the computerized service;

access a role template that defines basic authorizations with respect to one or more operations, including at least the target operation, wherein the role template defines the basic authorizations in a manner that is independent of the target data structure desired to be operated upon, and wherein the role template is contained within a role map document that is specific to one of the plurality of services and accessed from among a plurality of role map documents each specific to one of the plurality of services;

determine that the corresponding requesting entity is authorized to perform the target operation on the target data structure; and communicate to the target service that the requesting entity is authorized to perform the target operation on the target data structure.

34. A method as recited in claim 1, wherein the act of maintaining a plurality of role definitions that define access permissions for requesting entities by using one or more of the role templates comprises the following:

an act of maintaining a plurality of role definitions for the requesting entity, wherein at least one of the plurality of role definitions corresponds to an authentication method.

35. A method as recited in claim 1, wherein the act of identifying a role definition corresponding to the requesting entity comprises the following:

an act of referencing a role template; and an act of maintaining one or more refined scopes for refining a scope referenced in the role template, wherein the one or more refined scopes are independent of the role template and refinement occurs at a user level, and wherein the scope referenced in the role template indicates what portions of a data structure are visible to a role definition for a particular command method.

36. A method as recited in claim 1, wherein the act of determining access permissions for the requesting entity with respect to the command method using the role definition corresponding to the requesting comprises the following:

an act of determining access permissions below the data structure level.

37. A method as recited in claim 8, wherein each of the one or more role list documents are specific to a particular requesting entity.

38. A method as recited in claim 1, wherein the computerized service comprises a calendar service having a corresponding calendar service schema.

39. A method as recited in claim 1, wherein the computerized service comprises a notification service having a corresponding notification service schema.

40. A method as recited in claim 1, wherein the computerized service is external to the plurality of role map documents.

* * * * *